United States Patent [19]
Davis et al.

[11] Patent Number: 5,471,434
[45] Date of Patent: Nov. 28, 1995

[54] SYSTEM AND METHOD FOR RAPIDLY TRACKING VEHICLES OF SPECIAL UTILITY IN LOW SIGNAL-TO-NOISE ENVIRONMENTS

[75] Inventors: John S. Davis, Swansea, Mass.; Kai F. Gong, Pawtucket; Sherry E. Hammel, Little Compton, both of R.I.

[73] Assignee: The United States of America as represented by the Secretary of the Navy, Washington, D.C.

[21] Appl. No.: 324,639

[22] Filed: Oct. 18, 1994

[51] Int. Cl.⁶ .................................................... G01S 15/00
[52] U.S. Cl. .......................................... 367/124; 367/98
[58] Field of Search .................. 367/98, 124; 364/574, 364/516

[56] References Cited

U.S. PATENT DOCUMENTS

5,315,538  5/1994  Borrell et al. ................... 364/516

Primary Examiner—Daniel T. Pihulic
Attorney, Agent, or Firm—Michael J. McGowan; Michael F. Oglo; Prithvi C. Lall

[57] ABSTRACT

A system for facilitating the tracking of a target vehicle in connection with successively-received acoustic sensor signal data items. A fast Fourier transform operation is performed in connection with each successive acoustic sensor signal data item to generate a phase and amplitude beam map reflecting spectral signal energy in the received acoustic sensor signal data item. If the beam map for a acoustic sensor signal data item indicates that the item represents a signal having a signal-to-noise ratio above a first predetermined threshold value, a beam map generated for a previous acoustic sensor signal data item is used to generate a bounded beam map, a determination is made as to whether the bounded beam map represents a signal having a second predetermined signal-to-noise ratio. In response to a positive determination for the latter signal-to-noise determination, both the beam maps are used to generate tracking information for the target vehicle.

4 Claims, 5 Drawing Sheets

SYSTEM AND METHOD FOR RAPIDLY TRACKING VEHICLES OF SPECIAL UTILITY IN LOW SIGNAL-TO-NOISE ENVIRONMENTS

STATEMENT OF GOVERNMENT INTEREST

The invention described herein may be manufactured by or for the Government of the U.S. of America for Governmental purposes without the payment of any royalties thereon or therefor.

CROSS REFERENCE TO RELATED APPLICATIONS

This patent application is co-pending with related patent application 08/324,638, filed Oct. 18, 1994, entitled SYSTEM AND METHOD FOR RAPIDLY TRACKING HIGHLY DYNAMIC VEHICLES, Navy Case No. 76257 by the same inventors as this application.

BACKGROUND OF THE INVENTION (1) Field of the Invention

The invention relates generally to the field of signal processing and more particularly to a system and method for rapidly detecting a moving target and determining its movement characteristics, such as range, bearing, speed and course in a noisy environment.

(2) Description of the Prior Art

Detection of a moving object, such as a target, and determination of its range, bearing, speed and course in an ocean environment, is a difficult task, particularly if the target is moving relatively noiselessly and it is desired to perform the detect as early as possible. Typically, acoustic sensors are used to detect acoustic energy (sound waves) emitted by a moving object and convert such energy to electrical signals, and complex signal processing operations are performed in connection with the electrical signals to isolate and provide the desired information. An ocean environment is generally very noisy, and so low-level acoustic signals typical of quietly-moving targets and the high level of ambient noise joint to provide a relatively low ratio of desired signal-to-noise in the electrical signal provided by the sensor, which makes early and accurate detection quite difficult. In current systems, signals that do not have a signal-to-noise ratios above a selected predetermined threshold value are ignored, in which case such signals are not available to provide information which may potentially be useful in characterising the motion of the target.

SUMMARY OF THE INVENTION

It is therefore an object of the invention to provide a new and improved system and method for rapidly tracking moving objects in a noisy environment.

In brief summary, the invention provides a system for facilitating the tracking of a target vehicle in an ocean environment in connection with successively-received acoustic sensor signal data items representative of the motion of said target vehicle. The system includes fast Fourier transform means, signal detector means, a beam map bounds module, and a processor means. The fast Fourier transform means performs a fast Fourier transform operation in connection with each successive acoustic sensor signal data item to generate a phase and amplitude beam map reflecting spectral signal energy in the received acoustic sensor signal data item. The signal detector means determines whether the beam map generated by said fast Fourier transform means for a acoustic sensor signal data item indicates that the acoustic sensor signal data item represents a signal having a signal-to-noise ratio above a first predetermined threshold value. The beam map regions bound module, in response to a positive determination by said signal detector means, uses a beam map generated by the fast Fourier transform means for at least the acoustic sensor signal data item immediately proceeding the acoustic sensor signal data item for the signal having a signal-to-noise ratio above a predetermined threshold value to generate a bounded beam map, and determining whether the bounded beam map represents a signal having a second predetermined signal-to-noise ratio. Finally, the processing means, in response to a positive determination by said beam map regions bound module, uses both the beam map for the acoustic sensor signal data item representing the signal having a signal-to-noise ratio above the first predetermined threshold value and the beam map for the acoustic sensor signal data item whose bounded beam map represents a signal having a second predetermined signal-to-noise ratio to generate tracking information for said target vehicle.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 2A through 3 comprise flow diagrams illustrating the operation of the system depicted in FIGS. 1A and 1B.

DESCRIPTION OF THE PREFERRED EMBODIMENT

Figure 1A:
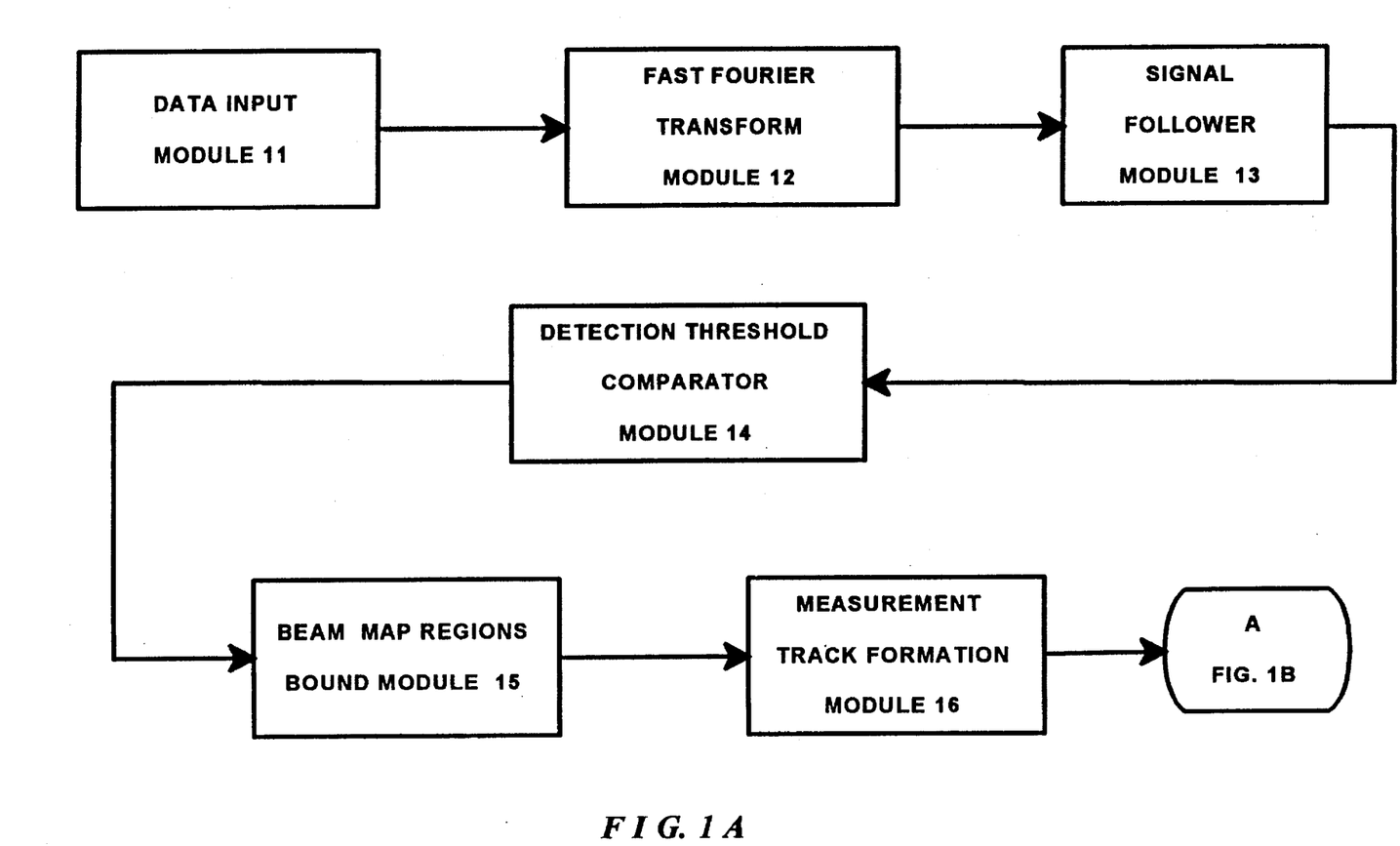
FIGS. 1A and 1B together constitute a functional block diagram of a system constructed in accordance with the invention.
Figure 1B:
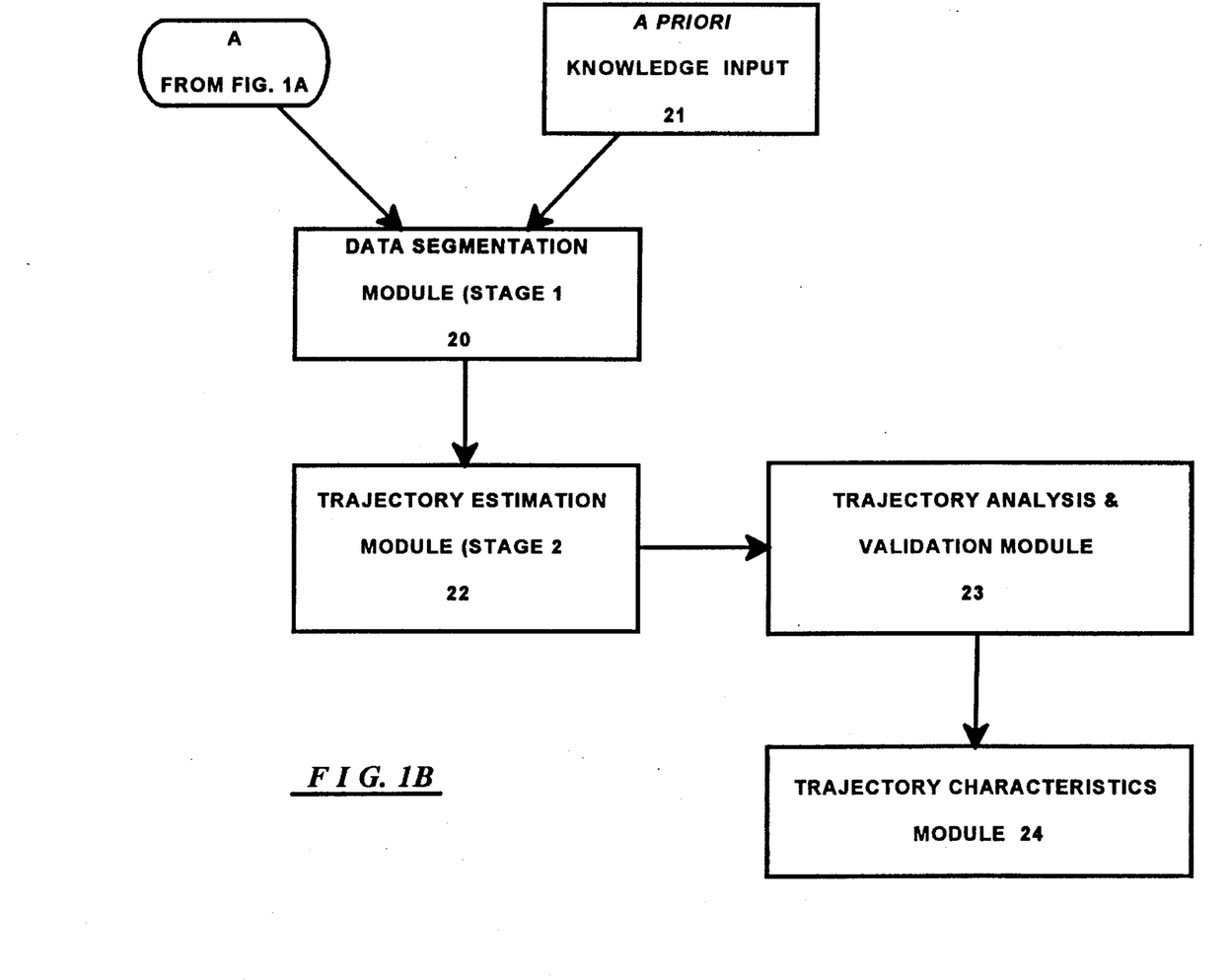

FIGS. 1A and 1B together constitute a functional block diagram of a system 10 for rapidly tracking highly dynamic vehicles, constructed in accordance with the invention. With reference to FIG. 1A, the system 10 includes a sensor arrangement 11 that receives acoustic energy (sound) in the form of signals from, for example, an ocean environment, converts the signals to electrical form, and records the electrical signals for later processing. A fast Fourier transform arrangement 12 performs a conventional fast Fourier transform (FFT) operation in connection with the recorded signals to thereby generate phase and amplitude spectral beam maps for the signals. A signal follower module 13 receives the beam maps from the fast Fourier transform arrangement 12 for signals at successive points in time and determines whether the beam map indicates that the signal-to-noise ratio of the signal as provided by the sensors 11 exceeds a predetermined detection threshold value, thereby to determine when the signals represent signals from a particular target and effectively distinguishing such target signals from environmental and other noise.

When the signal follower 13 determines that a beam map from the fast Fourier transform arrangement 12 exceeds the predetermined detection threshold value, a detection threshold comparator 14 compares the beam map corresponding to the signal at detection to the beam map immediately prior to detection (that is, for the last beam map from the fast Fourier transform arrangement 12 that did not exceed the predetermined detection threshold value) to detect similarities. A beam regions bound module 15 receives the beam maps and similarity information, and bounds the beam maps based on a priori information, such as kinematic and other information known about likely targets.

The detection threshold comparator 14 and beam regions bound module 15 repeat the operations with each beam map recorded by the sensor arrangement 11 prior to the signal follower 13 determining that a signal exceeded the signal-to-noise threshold value. This allows the detection threshold comparator 14 and the beam regions bound module 15 to obtain information concerning the target from the signals recorded prior to detection (that is, prior to the signal follower module 13 determining that a signal exceeded the signal-to-noise threshold value), so that the system 10 will not have to rely solely on signals received after such time. In addition, the system 10 facilitates a restriction on the number of signals that it will have to analyze and allow for subsequent information to be recorded at signal-to-noise ratios lower than the detection threshold values. In particular, a measurement track formations module 16 receives the information from the beam map bounds module and applies a lower signal-to-noise ratio threshold value than that applied by the signal follower module 13 to the beam maps recorded by the sensor arrangement prior to signal detection as determined by the signal follower module 13. The measurement track formations module 16 repeats these operations through a series of iterations, in each iteration applying a lower signal-to-noise ratio than in the previous iteration, to extract signal information from the background noise and clutter in those beam maps. For each of the beam maps that satisfy the signal-to-noise criteria for each of the iterations, the measurement track formations module 16 performs an inverse fast Fourier transform operation to transform the bounded beam maps to provide a time-based signal for later processing.

The signal information from the measurement track formations module 16 is then used by a data segmentation module 20 (FIG. 1B) and a trajectory estimation module 22 (FIG. 1B) to determine the range, bearing, speed and course of the target which is the source of the signal. The operations of the data segmentation module 20 and the trajectory estimation module will be described below in detail in connection with FIGS. 2A and 2B (the data segmentation module 20) and FIG. 3 (the trajectory estimation module 22). Briefly, however, the data segmentation module 20 receives the signal information from the measurement track formations module 16 and, using that information and a priori kinematic and other knowledge concerning likely targets from a priori knowledge input 21, generates one or more hypotheses regarding movement of the target. The trajectory estimation module 22 receives the hypotheses and selects one as the most likely hypothesis, effectively selecting the most likely trajectory (range and bearing) of the target. The trajectory that is selected is verified by a trajectory analysis and validation module 23 and a trajectory characteristics module 24 using conventional statistical measures testing the likelihood or probability that a trajectory is representative of the information contained in the signals received by the sensor arrangement 11.

As noted above, the data segmentation module 20 (FIG. 1B) generates a set of hypotheses $H_{ij}$ each containing one or more segments $S_j$. Each segment $S_j$ is a hypothesized line segment that the data segmentation module 20 generates in response to the signal information, represented by a series of data items, that the data segmentation module 20 receives from the measurement track formations module 16. The data segmentation module 20 generates the segments $S_j$ in a series of iterations for each successive data item it receives. In each iteration, the data segmentation module 20 effectively attempts to add the data item to each segment $S_j$ that it had initiated during previous iterations, and generates a likelihood measure indicating the likelihood that the data item actually belongs to each of the segments $S_j$. In addition during each iteration, the data segmentation module 20 initiates a new segment $S_N$ containing only the new data item, for the possibility that the data item is the first data item of a segment, and generates a likelihood measure indicating the likelihood that the data item is the first data item for a new segment; in each subsequent iteration, the new segment will be used along with other segments initiated during previous iterations as possible segments for subsequent data items. In addition, during each iteration the data segmentation module generates a "false alarm" hypothesis $H_{iFA}$ for the possibility that the data item does not belong to any segment. The trajectory estimation module 22 prunes the hypotheses and the various segments, and over a series of iterations, the data segmentation module 20 and trajectory estimation module 22 cooperate to narrow the hypothesized segments $S_j$.

Figure 2A:
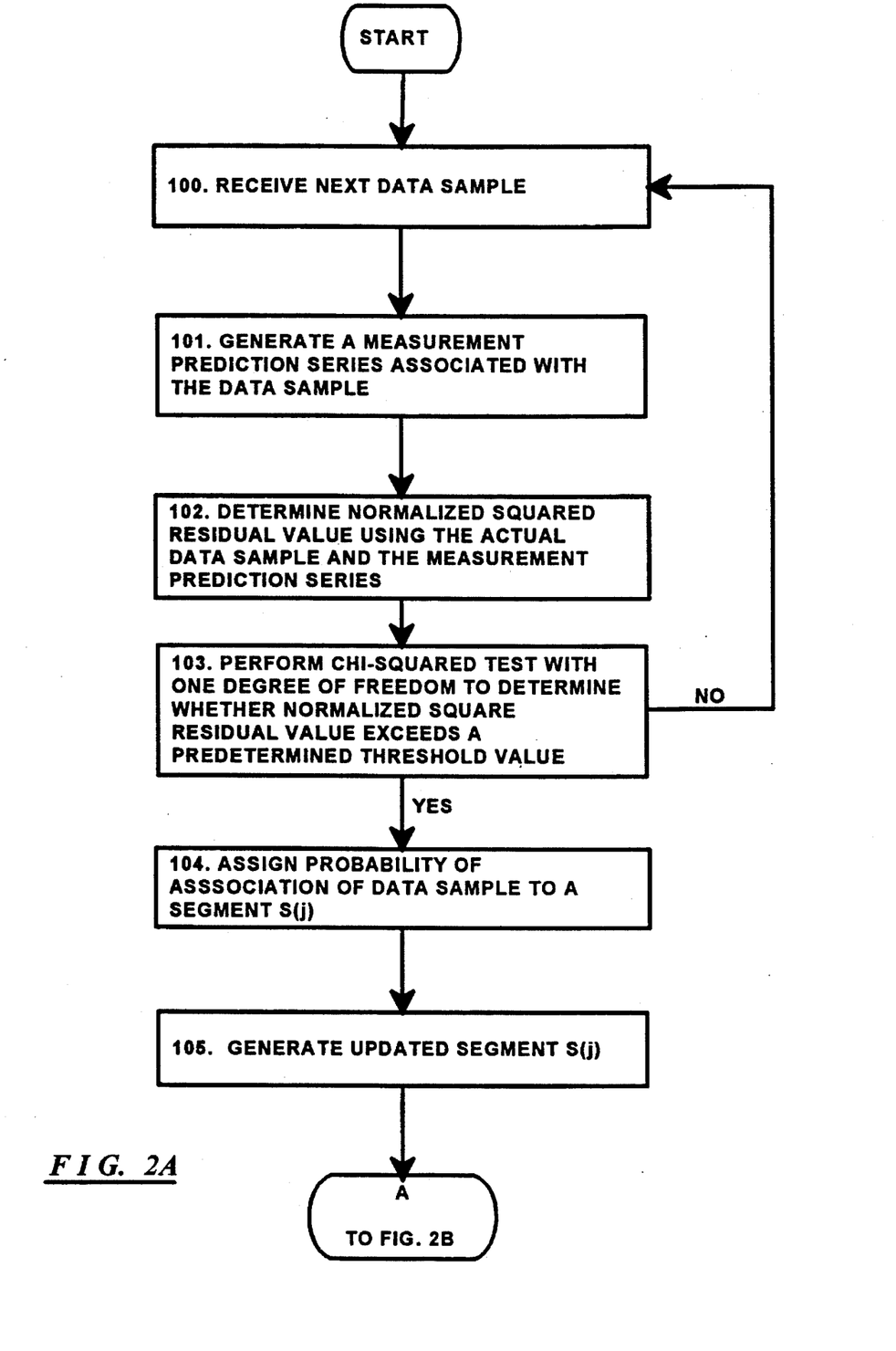
Figure 2B:
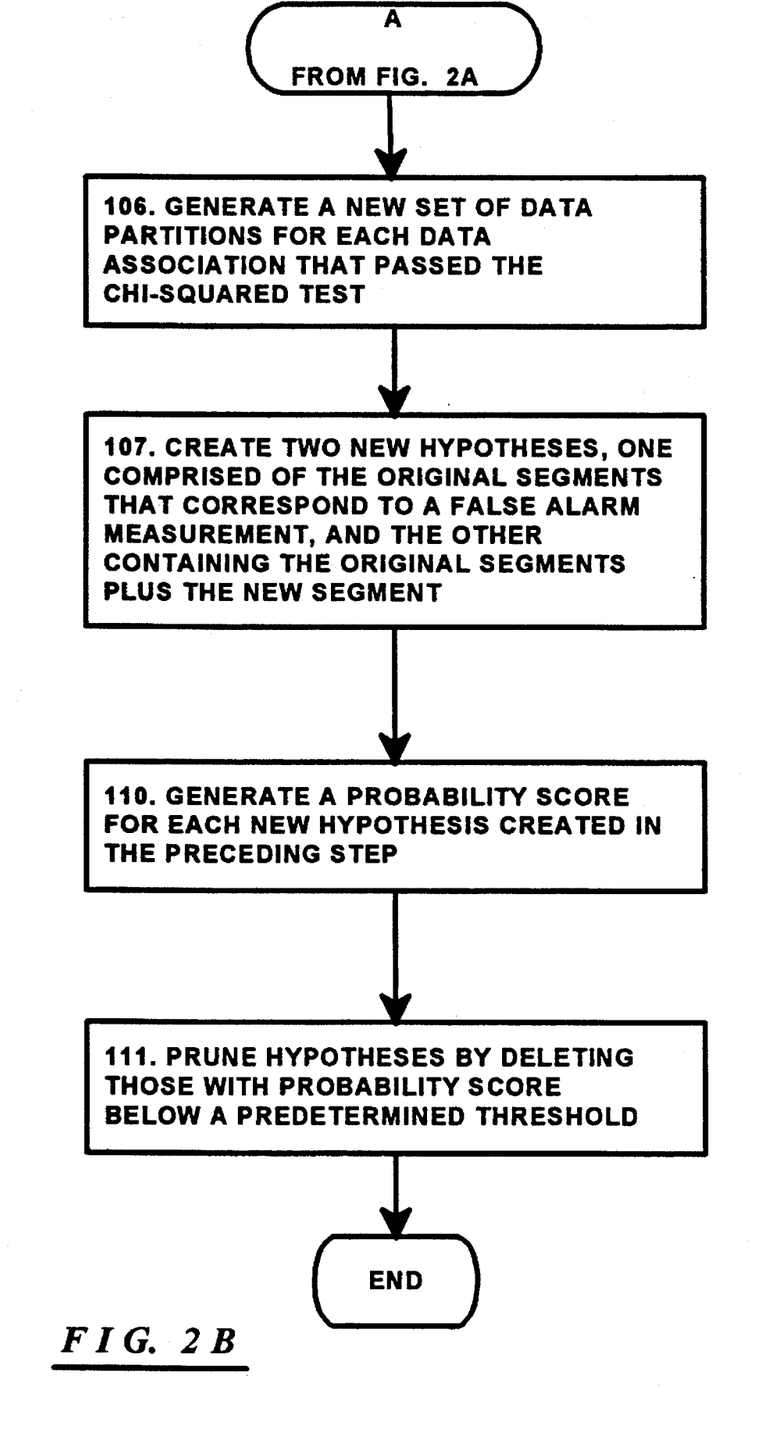
Figure 3:
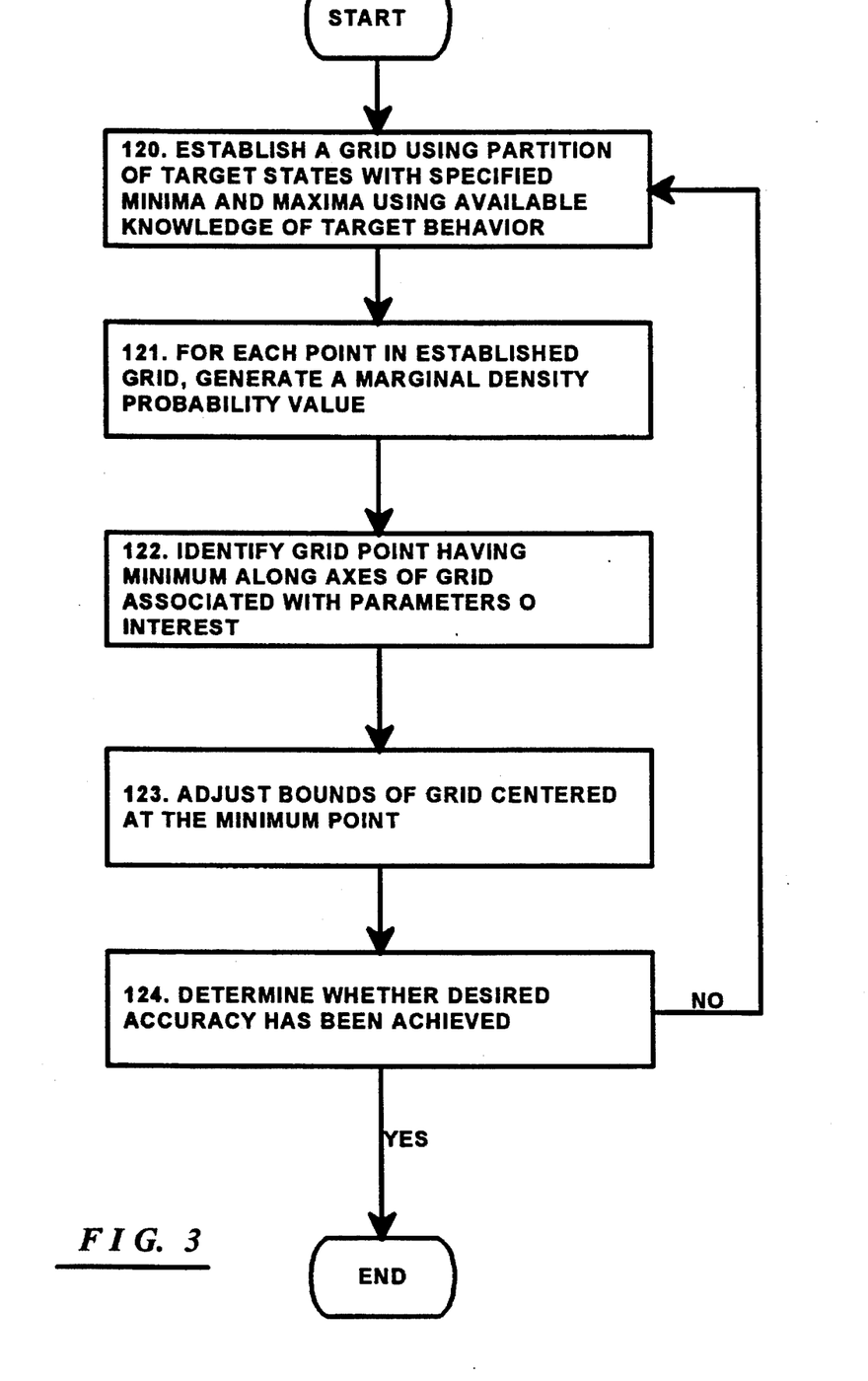

The operations performed by the data segmentation module 20 and the trajectory estimation module 22, each during one iteration, are depicted in FIGS. 2A, 2B (data segmentation module 20, and FIG. 3 (trajectory estimation module 22). With reference initially to the data segmentation module 20, the data segmentation module 20 represents each segment as a reduced set of regression coefficients, or "features" in the signal represented by the data stream. With further reference initially to FIG. 2A., upon receiving a new data item, identified herein as "$z_1(t)$" (step 100), the data segmentation module initially performs a series of steps 101 through 103 to test the statistical consistency of the data item $z_1(t)$ with each segment $S_j$.

In determining the statistical consistency, if it is assumed that a segment $S_j$ consists of "n" data items previously assigned to the segment $S_j$, the data segmentation module 20 initially forms a predicted data item value $\hat{z}_1(t/n)$ as set forth in Equation 1:

$$\hat{z}_1(t) = a_0(t^*) + a_1(t^*) + 1/2 a_2(t^*) \frac{(t-t^*)^2}{2} \tag{1}$$

where $a_i(t^*)$ are the i'th time derivatives of the measurement $z_1(t)$ evaluated at time t, (step 101). In this case, the data segmentation module 20 uses $t^*$ as the midpoint of the successive data intervals for the successive data items to minimize estimation errors for the regression operation.

After generating the predicted data item value $\hat{z}_1(t/n)$ via equation (1), the data segmentation module 20 generates a normalized squared residual value (step 102) as $$\hat{r}(t/n) = [z_1(t) - \hat{z}_1(t/n)]^T c(t/n) [z_1(t) - \hat{z}_1(t/n)] \tag{2}$$

and performs a chi-squared test in connection with $\hat{e}(t/n)$ to determine whether it satisfies a threshold "gating" value (step 103), which in one embodiment is set to the value thirty-six. If the data segmentation module 20 makes a negative determination in step 103, it will ignore the data item received in step 100, and will returns to step 100 to repeat the operations in steps 101 through 103 in connection with the next data item.

If, on the other hand, the data segmentation module 20 makes a positive determination in step 103, it assigns a probability value $P_a(S_j)$ identifying the likelihood that the new data item belongs to segment $S_j$ (step 104), and generates an updated segment $S_j'$ including the new data item (step 105). The data segmentation module 20 generates the probability value $P_a(S_j)$ as a function of the normalized squared residual value generated i step 102 prior to the chi-squared test, in a conventional manner. In one embodiment, for simplicity the probability assignment is obtained by mapping the normalized squared residual (equation 2) in an intuitive formula that approximates the complement of the chi-squared distribution as follows $$P_a(S_j) = \begin{cases} 1 - \dfrac{\hat{r}(t/n)}{36} & \text{for } \hat{r}(t/n) < 36 \\ 0 & \text{otherwise} \end{cases} \quad (3)$$

The data segmentation module 20 generates the updated segment $S_j'$ to include the new data item (identified as the "n+1"st data item) in the following manner. Given a value $a(t_n^*)$ as the current endpoint of segment $S_j$, the data segmentation module 20 generates a new endpoint $a(t_{n+1}^*/n+1)$ for the data item $z_1(t)$ as $$a(t_{n+1}^*/n+1) = a(t_{n+1}^*/n) + K(n)[z_1(t) - \hat{z}_1(t/n)] \quad (4)$$

where $$a(t_{n+1}^*/n) = A(t_{n+1}^*, t_n^*) a(t_n^*/n) \quad (5)$$

and $$A(t_{n+1}, t_n) = \begin{bmatrix} 1 & (t_{n+1} - t_n)^{1/2} & (t_{n+1} - t_n)^2 \\ 0 & 1 & (t_{n+1} - t_n) \\ 0 & 0 & 1 \end{bmatrix}. \quad (6)$$

The new endpoint, together with the points previously assigned to the segment $S_j$, defines an updated segment $S_j'$. The data segmentation module 20 determines the Kalman gain $K(n)$ for equation 3 as $$K(n) = R(t_{n+1}^*/n) H(t, t_{n-1}^*) c(t/n) \quad (7)$$

with $$c(t/n) = [H(t, t_n^*) R(t_n^*) H(t, t_n^*)^T + \sigma^2]^{-1} \quad (8)$$

and $$H(t, t_n^*) = [1 \ (t-t^*)] \quad (9)$$

and the corresponding covariance matrix of $a(t_{n+1}^*/n+1)$ is $$R(t_{n+1}^*/n+1) = [I - K(n) A(t_{n+1}^*, t_n^*)^T] R(t_{n+1} 8/n) \quad (10)$$

where $$R(t_{n+1}^*/n) = A(t_{n+1}^*, t_n^*) R(t_n^*/n) A(t_{n+1}^*, t_n^*)^T \quad (11)$$

and "I" is the three-by-three identity matrix.

After generating the updated segments $S_j'$ for all segments for which the chi-squared test was satisfied in step 103, the data segmentation module 20 effectively updates the set of hypotheses $H_i$. In that process, the data segmentation module 20 updates hypotheses $H_{ij}$ developed during previous iterations, in connection with previous data items in the series, replacing the segments $S_j$ in the respective hypotheses with updated segments $S_j'$ (step 106). In addition, the data segmentation module 20 establishes two new hypotheses, one hypothesis $H_{iFA}$ comprised of the original segments and the other hypothesis $H_{iN}$ comprised of the original segments plus a new segment $S_N$ representing the new data item. The hypothesis $H_{iFA}$, since it contains only the original, non-updated segments, represents the likelihood that the new data item is a "false alarm" that is that it neither belongs to any segment $S_j$ nor is the first data item of a new segment $S_N$. The hypothesis $H_{iN}$, on the other hand, represents the likelihood that the new data item is the first data item of a new segment $S_N$ and that the other segments $S_j$ are incorrect hypotheses.

The data segmentation module 20 then proceeds to a series of steps to generate several likelihood scores for each hypothesis. In particular, the data segmentation module generates a raw likelihood score $P(H_i/nm+1)$ for the original (non-updated) hypotheses $H_i$ as $$P(H_i/n+1) = P(H_i/n) \left[ \left( 1 - \prod_{j=1}^{K} 1 - P_a(S_j) \right) (1 - P_n)(1 - P_{FA}) + P_N(1 - P_{FA}) + P_{FA} \right] \quad (12)$$

where "$P_N$" represents the a priori likelihood that the data item $z_1(t)$ starts a new segment, "$P_{FA}$" represents the a priori likelihood that data item $z_1(t)$ is a "false alarm" that is, that it does not belong to any segment, and "K" is the number of segments $S_j$ in the collection of segments in hypothesis $H_i$. The a priori likelihood values are provided by the a priori knowledge input module 21, and are generated in any conventional manner.

The data segmentation module 20 then, for each hypothesis $H_i$ in the collection of hypotheses H updated in step 106, generates likelihood scores for a series of hypotheses $H_{ij}$, where each hypothesis $H_{ij}$, corresponds to the collection of segments in hypothesis $H_i$, but replacing the original of segment $S_j$ with the updated segment $S_j'$, as well as for the hypotheses $H_{iN}$ and $H_{iFA}$ (step 110). In those operations, the data segmentation module 20 generates the likelihood score $P(H_{ij})$ for each hypothesis $H_{ij}$ as $$P(H_{ij}) = \quad (13)$$

$$P(H_i/n+1) \dfrac{\left[ 1 - \prod_{j=1}^{K} (1 - P_a(S_j)) \right] (1 - P_{FA}) \dfrac{P_a(S_j)}{1 - P_a(S_j)}}{\sum_{j=1}^{K} (1 - P_a(S_j))},$$

the likelihood score $P(H_{iN})$ for the augmented hypothesis $H_{iN}$ (that is, the hypothesis that the data item is the first data item for a new segment) as:

$$P(H_{iN}) = P(H_i/n+1) \left[ \prod_{j=1}^{k} (1 - P_a(S_j)) \right] (I - P_{FA}), \quad (14)$$

and the likelihood score $P(H_{iFA})$ for false-alarm hypothesis $H_{iFA}$ as $$P(H_{iFA}) = P(H_i/n+1) P_{FA} \quad (15).$$

After generating the likelihood scores, the data segmentation module 20 prunes the hypotheses $H_{in}$, $H_{iN}$ and $H_{iFA}$ by deleting the hypotheses that have likelihood scores below a predetermined threshold value (step 111). The data segmentation module prunes a segment $S_j$, that is, it completely eliminates the segment, when the segment is no longer contained in any hypothesis $H_{ij}$ for any index "i".

After performing steps 100 through 111 for one data item, the data segmentation module 20 returns to step 100 to process the next data item. The data segmentation module 20 performs steps 100 through 111 for each data item representing a signal it receives from the measurement track formation module 16.

After generating the hypotheses $H_i$ for a set of data items, the data segmentation module 20 then transfers the set of pruned segments $S_j$ contained in the hypotheses $H_{ij}$ and $H_{iN}$ to the trajectory estimation module 22. The trajectory estimation 18 module 22 then performs a discrete grid search procedure depicted in FIG. 3 in connection with all of the segments $S_j$ to select one segment $S_j$ as being most representative of the information represented by the data items. With reference to FIG. 3, the trajectory estimation module 22 uses as the various target variables representing the target states such target variables as range "r", bearing "b", speed "s", course "c" and course rate "c", and establishes a series of "bins" with the minimum and maximum values for each of these variables as determined from a priori knowledge of the possible target (step 120). The result, if the target variables r, b, s, c and c are considered to form a five-dimensional space, is a five-dimensional grid of a size determined by the minimum and maximum values for each variable. In selecting a segment $S_j$ as the potentially correct segment, the trajectory estimation module 22 makes the determination based on certain ones of the variables, as indicated by the nature of the particular data items, in this case range "r" and bearing "b". After the grid is established, for each discrete point in the grid, the trajectory estimation module 22 generates a marginal density value $P_{ij}$ (step 121) along the coordinates "i" and "j" of these data items as $$P_{ij} = \sum_{klm} e^{-\frac{1}{2} z - z(r_i, b_j, s_k, c_l, c_m)^2} \quad (16)$$

The trajectory estimation module 22 then identifies the point (i,j) at which the marginal density value is a minimum (step 122), and adjusts the perspective of the grid so that it is centered over that point (123). The trajectory estimation module 22 determines whether a selected accuracy level, as determined by the resolution of the grid generated by the trajectory estimation module 22, has been reached (step 124), and if not returns to step 120 to repeat the operations. The trajectory estimation module 22 repeats the operations until the selected accuracy level has been reached, and if so it performs a chi-squared test in connection with the segment $S_j$. It will be appreciated that the trajectory estimation module 22 will perform these operations in connection with all of the segments $S_j$, and it will use the results of the chi-squared tests for all of the segments to identify one as being most representative of the data, and that segment is selected as the correct one.

As noted above, and returning to FIG. 1B, the segment selected by the trajectory estimation module 22 is coupled to a trajectory analysis and validation module 23 and a trajectory characteristics module 24 for verification using conventional statistical measures testing the likelihood or probability that a trajectory is representative of the information contained in the signals received by the sensor arrangement 11.

The invention provides a number of advantages. It facilitates the detection and use of use of signals received that are below the (initial) signal-to-noise ratio, despite the fact that such signals are embedded in an increased level of clutter and noise. This enables the system to determine the location and bearing of a target relatively early and quickly.

In addition, the invention provides an arrangement for quickly and reliably tracking a target with an environmentally perturbed minimal data set comprising only a few data items which exploits target kinematics and a priori knowledge, which further allows for anomolies in the data. Using multiple hypothesis techniques, such as described in connection with the data segmentation module 20 and the trajectory estimation module 22 (FIGS. 2A, 2B and 3) allows for accommodation of changes in dynamics and quick evaluation of the target dynamics. The segmentation of acoustical information, as performed by the data segmentation module 20, allows for partitioning of the data according to similar features, which, in turn, allows for rapid detection of motion changes. The discrete grid search technique performed by the trajectory estimation module 22 provides for relative stability in the non-linear estimation problem and exploitation of a priori knowledge of target motion.

It will be appreciated by those skilled in the art that the new arrangement can be implemented using special-purpose hardware or a suitably-programmed general purpose computer.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for facilitating the tracking of a target vehicle in an ocean environment in connection with successively-received acoustic sensor signal data items representative of the motion of said target vehicle, said system comprising:

fast Fourier transform means for performing a fast Fourier transform operation in connection with each successive acoustic sensor signal data item to generate a phase and amplitude beam map reflecting spectral signal energy in the received acoustic sensor signal data item;

signal detector means for determining whether the beam map generated by said fast Fourier transform means for a acoustic sensor signal data item indicates that the acoustic sensor signal data item represents a signal having a signal-to-noise ratio above a first predetermined threshold value;

a beam map regions bound module for, in response to a positive determination by said signal detector means, using a beam map generated by the fast Fourier transform means for at least the acoustic sensor signal data item immediately proceeding the acoustic sensor signal data item for the signal having a signal-to noise ratio above a predetermined threshold value to generate a bounded beam map, and determining whether the bounded beam map represents a signal having a second predetermined signal-to-noise ratio; and processing means responsive to a positive determination by said beam map regions bound module for using both the beam map for the acoustic sensor signal data item representing the signal having a signal-to-noise ratio above the first predetermined threshold value and the beam map for the acoustic sensor signal data item whose bounded beam map represents a signal having a second predetermined signal-to-noise ratio to generate tracking information for said target vehicle.

2. A system as defined in claim 1 in which said second predetermined threshold value is less than said first predetermined threshold value.

3. A system as defined in claim 1 in which said processing means includes:

inverse fast Fourier transform means for generating an inverse fast Fourier transform for both the beam map for the acoustic sensor signal data item representing the signal having a signal-to-noise ratio above the first predetermined threshold value and the beam map for the acoustic sensor signal data item whose bounded beam map represents a signal having a second predetermined signal-to-noise ratio, thereby to generate respective temporal domain data items; and spacial domain search means for using the temporal domain data items to generate said tracking information for said target vehicle.

4. A system as defined in claim 1 in which said acoustic sensor data items represent data concerning motion of the target vehicle selected from the group consisting of (i) target vehicle bearing, (ii) target vehicle range, (iii) target vehicle course, and (iv) target vehicle speed.

\* \* \* \* \*